(12) United States Patent
Furutake

(10) Patent No.: US 10,144,364 B2
(45) Date of Patent: Dec. 4, 2018

(54) ON-VEHICLE CAMERA APPARATUS CAPTURING IMAGE IN FRONT OF VEHICLE AND PERFORMING VEHICLE CONTROL

(71) Applicant: DENSO CORPORATION, Kariya, Aichi-pref. (JP)

(72) Inventor: Yasuki Furutake, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 56 days.

(21) Appl. No.: 15/240,840

(22) Filed: Aug. 18, 2016

(65) Prior Publication Data

US 2017/0064175 A1 Mar. 2, 2017

(30) Foreign Application Priority Data

Aug. 24, 2015 (JP) ................................. 2015-164907

(51) Int. Cl.
*H04N 5/00* (2011.01)
*B60R 11/04* (2006.01)
(Continued)

(52) U.S. Cl.
CPC ............... *B60R 11/04* (2013.01); *G02B 3/02* (2013.01); *G02B 5/208* (2013.01);
(Continued)

(58) Field of Classification Search
CPC .... H04N 5/225; H04N 5/2251; H04N 5/2252; H04N 5/2257; G06K 9/00;
(Continued)

(56) References Cited

U.S. PATENT DOCUMENTS 3,762,801 A * 10/1973 Baker .................... G02B 13/00
359/716
5,212,593 A * 5/1993 Williamson ........... G02B 13/14
359/485.07

(Continued)

FOREIGN PATENT DOCUMENTS

JP H01-227110 9/1989
JP 2001-088609 4/2001
(Continued)

*Primary Examiner* — Frank F Huang
(74) *Attorney, Agent, or Firm* — Knobbe, Martens, Olson & Bear, LLP

(57) ABSTRACT

An on-vehicle camera apparatus capturing an image in front of a vehicle includes: a camera module outputting image data and a control circuit board. The camera module includes an optical element that refracts incident light so as to diverge or focus the incident light, and an image sensor element in which incident light transmitted through the optical element forms an image. The control circuit board executes, based on the image data outputted by the camera module, a recognition process recognizing a state in front of the own vehicle, and also executes at least two vehicle control processes among a headlight control process, a forward collision preventing process and a lane departure warning process, as a result of the recognition process. According to the on-vehicle camera apparatus, a resin-made lens is used for the optical element.

9 Claims, 13 Drawing Sheets

(51) Int. Cl.
*H04N 7/18* (2006.01)
*G02B 3/02* (2006.01)
*G02B 5/20* (2006.01)
*G06K 9/00* (2006.01)
*G06K 9/20* (2006.01)
*H04N 5/225* (2006.01)
*H04N 5/357* (2011.01)
*B60R 11/00* (2006.01)

(52) U.S. Cl.
CPC ..... *G06K 9/00798* (2013.01); *G06K 9/00805* (2013.01); *G06K 9/2027* (2013.01); *H04N 5/2254* (2013.01); *H04N 5/3572* (2013.01); *H04N 7/183* (2013.01); *B60R 2011/0026* (2013.01)

(58) Field of Classification Search
CPC ....... G06K 9/00791; G06T 7/00; B60R 11/04; B60R 2011/0026; G03B 17/55
See application file for complete search history.

(56) References Cited

U.S. PATENT DOCUMENTS

| | | | |
|---|---|---|---|
| 5,790,320 A | 8/1998 | Han et al. | |
| 6,930,842 B2 | 8/2005 | Shibazaki | |
| 8,570,374 B2 | 10/2013 | Betham et al. | |
| 2002/0015222 A1* | 2/2002 | Kuwabara | G02B 5/1814 359/361 |
| 2003/0025597 A1 | 2/2003 | Schofield | |
| 2005/0099527 A1 | 5/2005 | Fujii | |
| 2005/0259318 A1* | 11/2005 | Armstrong | G02B 17/0808 359/350 |
| 2006/0256451 A1* | 11/2006 | Schaack | G02B 27/0025 359/741 |
| 2007/0183064 A1 | 8/2007 | Shibazaki | |
| 2007/0190314 A1* | 8/2007 | Aiki | G02B 1/041 428/327 |
| 2010/0052417 A1 | 3/2010 | Aoba et al. | |
| 2010/0134616 A1 | 6/2010 | Seger et al. | |
| 2011/0085070 A1* | 4/2011 | Kang | B29D 11/00432 348/340 |
| 2011/0157727 A1* | 6/2011 | Sasaki | G02B 7/02 359/808 |
| 2011/0216195 A1* | 9/2011 | Tanaka | H04N 5/2253 348/148 |
| 2012/0062859 A1 | 3/2012 | Kitamura | |
| 2012/0308082 A1 | 12/2012 | Murao et al. | |
| 2014/0177065 A1* | 6/2014 | Adachi | G02B 15/173 359/684 |
| 2015/0086079 A1 | 3/2015 | Murao et al. | |
| 2015/0117715 A1 | 4/2015 | Murao et al. | |
| 2015/0256729 A1* | 9/2015 | Wato | H04N 5/2252 348/311 |
| 2016/0119509 A1 | 4/2016 | Wato | |
| 2017/0223243 A1* | 8/2017 | Nakamura | H04N 5/2254 |
| 2018/0027191 A2 | 1/2018 | Grauer | |

FOREIGN PATENT DOCUMENTS

| | | |
|---|---|---|
| JP | 2005-079931 | 3/2005 |
| JP | 2010-537602 | 12/2010 |
| JP | 2013-003547 | 1/2013 |
| JP | 2013-020026 A | 1/2013 |
| JP | 2013-197670 | 9/2013 |

* cited by examiner

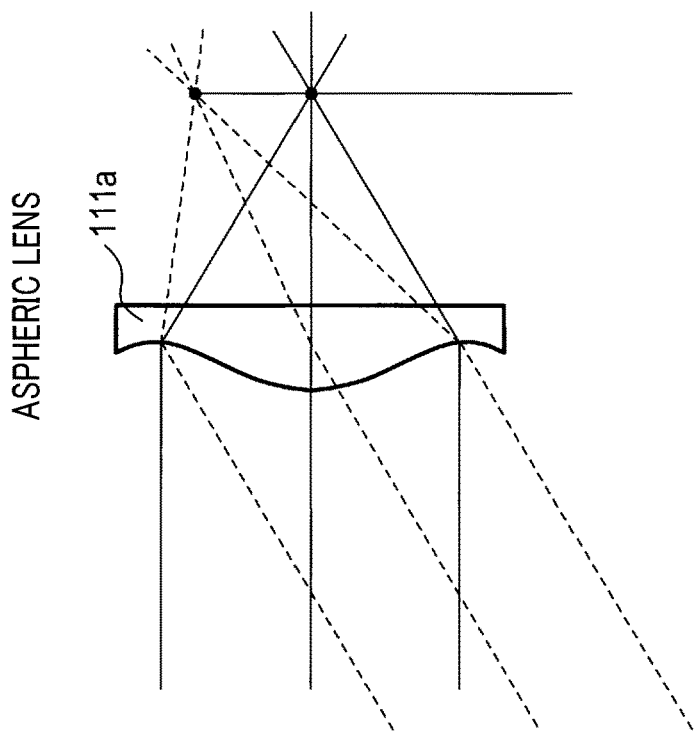
FIG.9B ASPHERIC LENS
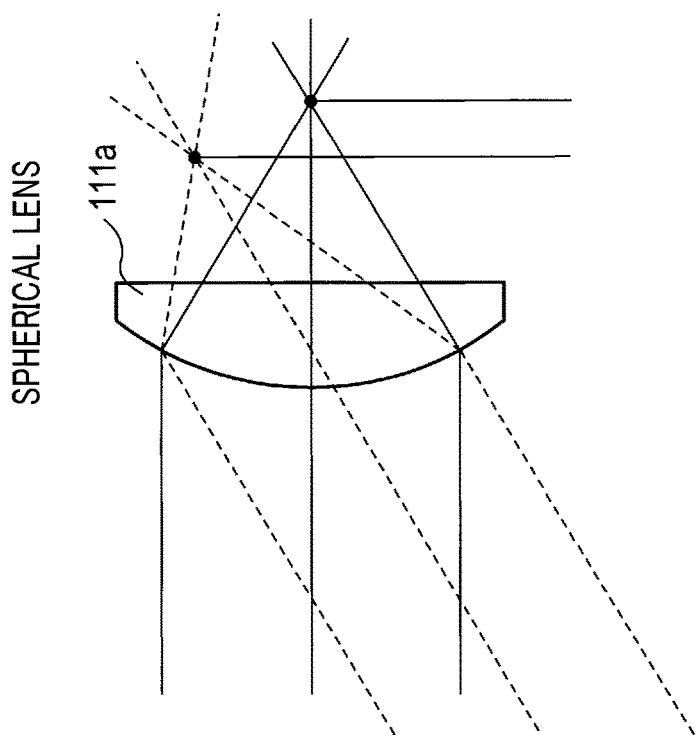
FIG.9A SPHERICAL LENS

WITHOUT OPTICAL FILTER

WITH OPTICAL FILTER

ON-VEHICLE CAMERA APPARATUS CAPTURING IMAGE IN FRONT OF VEHICLE AND PERFORMING VEHICLE CONTROL

CROSS-REFERENCE TO RELATED APPLICATION

This application is based on and claims the benefit of priority from earlier Japanese Patent Application No. 2015-164907 filed Aug. 24, 2015, the description of which is incorporated herein by reference.

BACKGROUND

Technical Field

The present disclosure related to an on-vehicle camera apparatus, which captures an image in front of the vehicle.

Description of the Related Art

Conventionally, on-vehicle camera apparatuses are known. On-vehicle camera apparatuses are used to recognize lane boundary lines based on captured images of in front of the vehicle. According to this type of camera apparatus, for example, Japanese Patent No. 4143521 discloses an on-vehicle camera having an optical filter that attenuates incident light entering an imager by cutting wavelengths in a predetermined wavelength range, so as to readily recognize a yellow lane line or a blue lane line on a concrete road.

However, generally, conventional on-vehicle camera apparatuses use a lens made of glass. Hence, it is difficult to accomplish further weight reduction or a cost reduction for the camera apparatuses.

Moreover, according to conventional camera apparatuses, since the transmittance of the lens is not prevented from degrading due to yellowing of the lens, light-receiving intensity of each pixel is changed in an imager before/after occurrence of the yellowing. As a result, a problem arises that an accuracy of image recognition may be decreased.

SUMMARY

The present disclosure has been achieved in light of the above-described circumstances and aims to provide an on-vehicle camera apparatus contributing at least one of weight reduction, cost reduction, long-life operation, an improvement of reliability.

According to one aspect of the on-vehicle camera apparatus of the present disclosure, the on-vehicle camera apparatus is provided with a camera module and a control circuit board. The camera module includes an optical element that refracts incident light so as to diverge or focus the incident light, and an image sensor element at which incident light transmitted through the optical element forms an image. The camera module outputs image data based on a signal to which a photoelectric conversion is applied by the imaging sensor element.

The control circuit board executes based on the image data outputted by the camera module, a recognition process recognizing a state in front of the own vehicle, and executes, based on a recognition result of the recognition process, at least two vehicle control processes among a headlight control process, a forward collision preventing process and a lane departure warning process.

According to another aspect of the on-vehicle camera apparatus of the present disclosure, a resin-made lens is used for the optical element. Therefore, compared to a glass lens which is typically used, the on-vehicle camera apparatus can easily achieve weight reduction, cost reduction and long-life operation.

According to still another aspect of the on-vehicle camera apparatus of the present disclosure, the camera module further includes an optical filter that attenuates the incident light entering the image sensor element. The optical filter has spectral characteristics which transmit light having a wavelength longer than or equal to a predetermined lower cutoff wavelength, the predetermined lower cutoff wavelength being determined based on a change ratio of a transmittance of the resin-made lens which changes before/after yellowing of the resin-made lens.

According to these configurations, a change in light-receiving intensity of the imaging sensor element can be minimized before/after yellowing of the resin-made lens. Thus, in the recognition process, for example, binarization of the image data can be performed using a predetermined threshold so that the recognition result can be obtained without degrading the accuracy even after yellowing of the resin-made lens. Hence, the on-vehicle camera apparatus can improve reliability and contribute a long time operation.

BRIEF DESCRIPTION OF THE DRAWINGS

In the accompanying drawings:

FIGS. 9A and 9B are a set of explanatory diagrams showing effects obtained when using an aspheric lens, where FIG. 9A is a focal length of a spherical lens, and FIG. 9B is a focal length of an aspheric lens;

FIG. 10A is a lens transmittance and a sensor spectral sensitivity before an optical high pass filter is disposed, and FIG. 10B is a lens transmittance and a sensor spectral sensitivity after the optical high pass filter is disposed;

FIG. 11A is a unit pattern, and FIG. 11B is a whole pattern;

DETAILED DESCRIPTION OF THE PREFERRED EMBODIMENTS

Hereinafter, with reference to the drawings, exemplary embodiments of the present disclosure will be described. Reference signs used in the embodiments are appropriately used in the claims. However, this is to aid ready understanding of the present disclosure and not to limit technical scope of the present disclosure.

First Embodiment

[1-1 Configuration]

Figure 1:
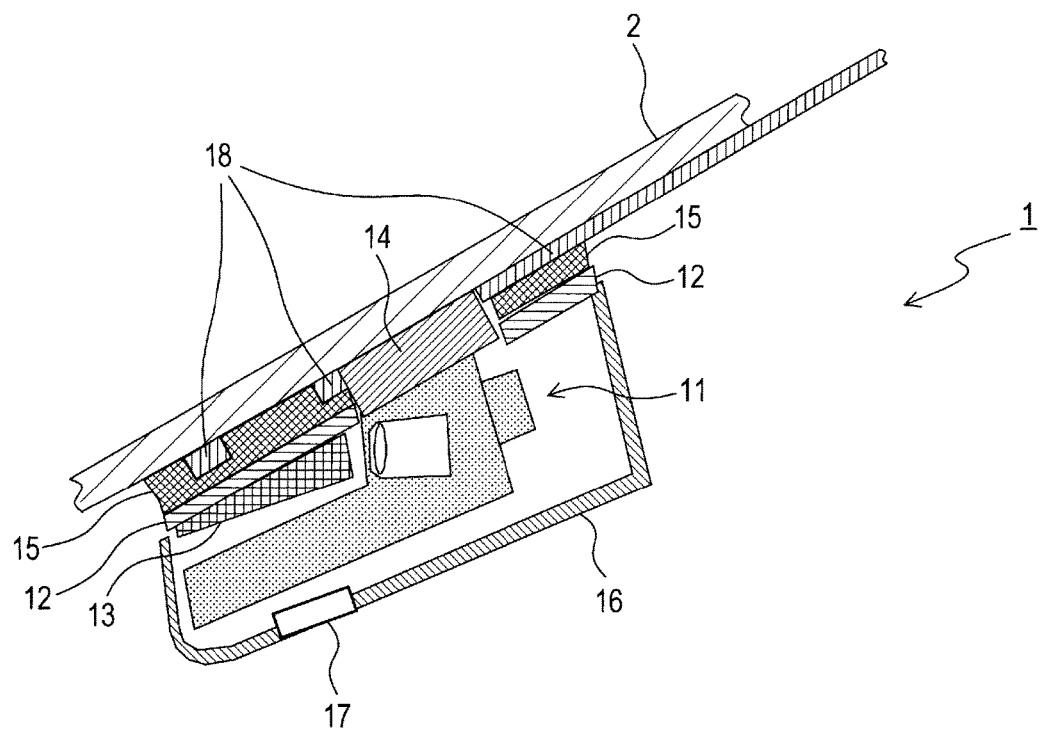
FIG. 1 is a cross sectional view showing a camera apparatus.
Figure 2:
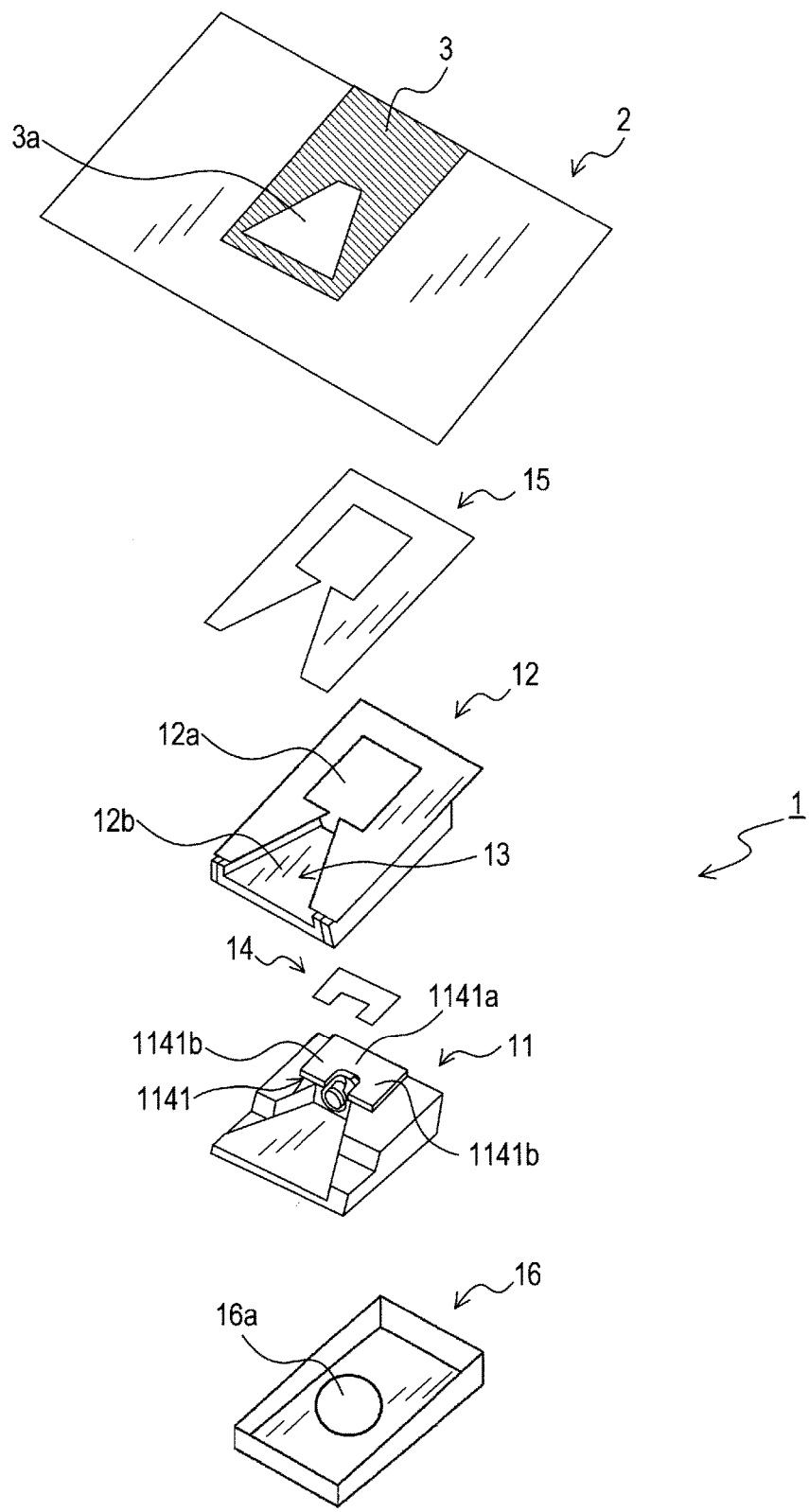
FIG. 2 is a perspective view showing a disassembled camera apparatus.

A camera apparatus 1 shown in FIGS. 1 and 2 are attached to the inside (from vehicle cabin side) of a windshield 2 of a vehicle. The camera apparatus 1 is disposed in a central portion (in the vicinity of the rearview mirror) of an upper side of the windshield 2. The camera apparatus 1 is provided with an image sensor 11, a bracket 12, a hood 13, a first heat conduction member 14 and a second heat conduction member 15, a cover, 16, a ventilation fan 17 and a heating wire 18. In FIGS. 1 and 2, a part of the windshield 2 is illustrated. In FIG. 2, for convenience of explanation, the ventilation fan 17 and the heating wire 18 are omitted. It should be noted that the vehicle having the camera apparatus mounted thereon is referred to as the "own vehicle". The camera apparatus 1 corresponds to an example of the on-vehicle camera apparatus.

Figure 3:
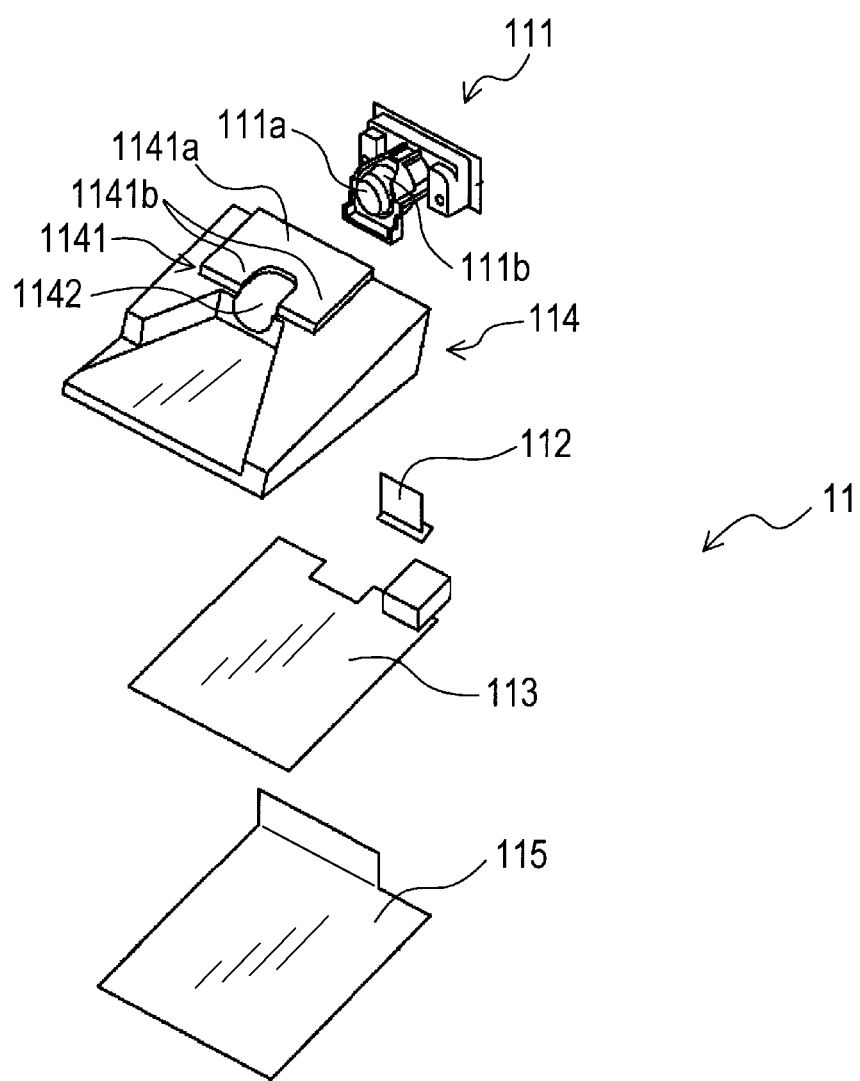
FIG. 3 is a perspective view showing a disassembled image sensor.

As shown FIG. 3, the image sensor 11 is provided with a camera module 111, an electrical wiring 112, a control circuit board 113, a casing 114 and a lower cover 115.

The camera module 111 is provided with a lens 111a, a lens barrel member 111b (hereinafter also referred to lens barrel), and an image sensor arranged on the light axis of the lens in the lens barrel (not shown; hereinafter referred to as imager), and captures a scene in front of the own vehicle. The lens barrel member 111b is a portion having a cylindrical shape, supporting the lens 111a inside thereof. The image sensor is configured of a known array type image sensor and a RGBC Bayer, where the array type image sensor has light receiving elements such as a CMOS sensor and a CCD sensor being arranged in an array to acquire an optical image, and the RGBC Bayer is composed of plural types of color filters each having different passband (according to the present embodiment, passband is defined as a wavelength region corresponding to each of red, green, blue and transparent colors). Each of the light receiving elements is configured to receive incident light through any one of color filers which compose the RGBC Bayer.

The light receiving element has a receiving light band having sensitivity to a wavelength corresponding to at least visible light. The light receiving element corresponds to an example of an image sensor element in which incident light transmitted through the lens 111a forms an image. The lens 111a is a resin-made lens composed of a transparent material containing, e.g., polyolefinic resin, which is an example of an optical element that refracts incident light so as to diverge or focus the light.

The electrical wiring 112 is a component (e.g., flexible printed board) that electrically connects the camera module 111 and the control circuit board 113.

Figure 4:
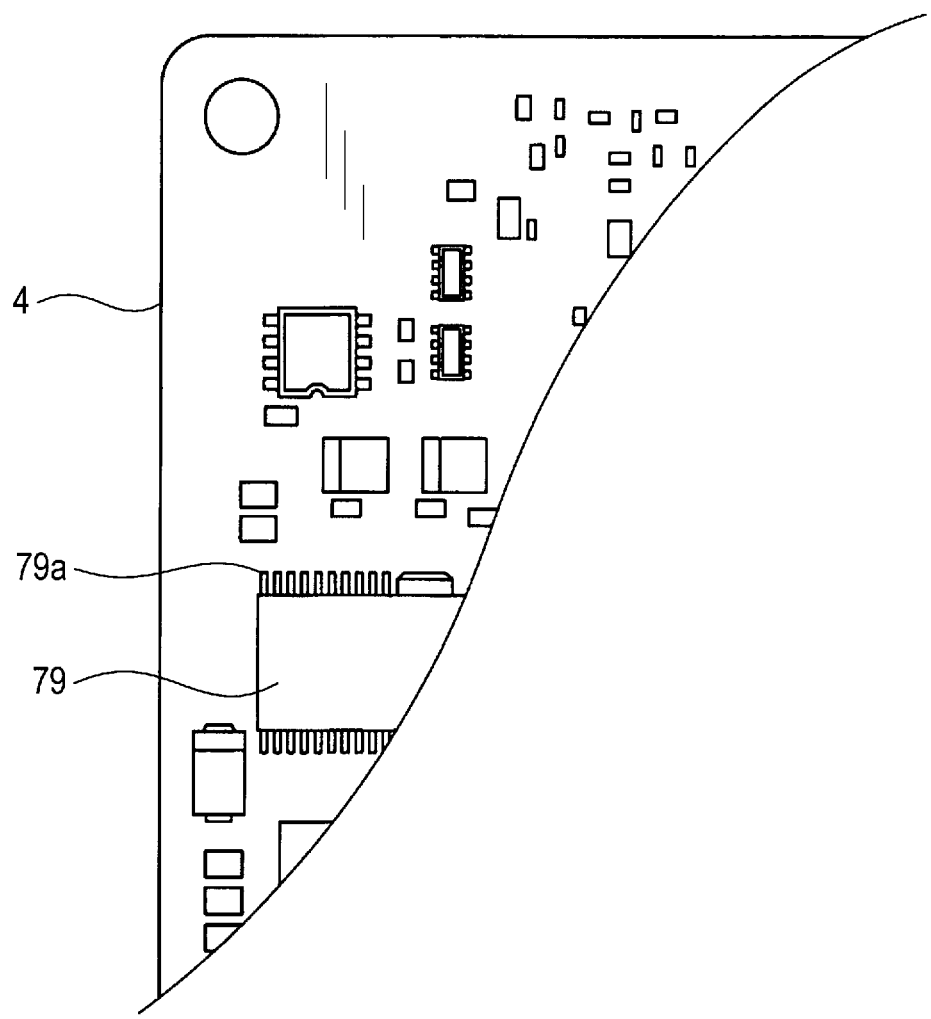
FIG. 4 is an external view showing a control circuit board.

The control circuit board 113 is a plate-like component provided with a microcomputer including CPU, ROM and RAM, and executes a recognition process for recognizing a state in front of the own vehicle, on the basis of image data produced from a signal which is photoelectric-converted by the image sensor in the camera module 111. The control circuit board 113 executes, based on the result of the recognition process, a vehicle control process to control equipment mounted on the own vehicle. An object to be recognized in the recognition process, and content of the vehicle control process will be described later. An image processing circuit 79 is mounted on the control circuit board 113. As shown in FIG. 4, the image processing circuit 79 is an electronic device operated with a 3.3V source, having signal lines capable of being driven by 3.3V or less. Hence, the image processing circuit 79 consumes less power and heat quantity. Further, the image processing circuit 79 includes a plurality of external connection terminals (for example, terminal 79a) of which the terminal pitch is 1.27 mm or less. Hence, the image processing circuit 79 and the control circuit board 113 can be shrunk easily. When the image processing circuit 79 is configured of a single device (e.g., IC chip), the device has a plurality of external connection terminals of which the terminal pitch is 1.27 mm or less. However, when the image processing circuit 79 is configured of a plurality of devices (e.g., IC chips), at least one of the devices may have the plurality of external connection terminals of which the terminal pitch is 1.27 mm or less.

The casing 114 is a container-like member having a side wall and an upper wall, and an open space in the lower portion, accommodating the camera module 111, the electrical wiring 112 and the control circuit board 113 to be covered from above. Moreover, a notch portion 1142 is formed on a glass side wall portion 1141 in the casing 114. The notch portion 1142 allows the lens barrel member 111b of the camera module 111 to be exposed to the windshield 2. The glass side wall portion 1141 is a part of the upper wall of the casing 114 located closer to the windshield 2 side than the camera module 111 is, inside the casing 114, under a state where the casing 114 has been fixed to the windshield 2 via the bracket 12 with a method which will be described later.

The lower cover 115 covers the lower part of the casing 114. On the other hand, the bracket 12 shown in FIGS. 1 and 2 is made of resin, having substantially a plate shape, in which an opening 12a is formed in a central portion thereof, and a notch portion 12b is formed in a region surrounding the opening 12a so as to make the bracket 12 have a U-shape. The bracket 12 is used to fix the casing 114 of the image sensor 11 to the windshield 2. In other words, one surface perpendicular to the thickness direction in the surfaces of the bracket 12 is fixed (adhered in this example) to the windshield 2, and the casing 114 is attached to the bracket 12 being fixed, whereby the casing 114 is fixed to the windshield 2. Thus, in the bracket 12, since the opening 12a is formed in a state where the casing 114 is fixed to the windshield 2 via the bracket 12, the casing 114 and the windshield 2 face each other. In other words, the casing 114 and the windshield 2 face each other in a state where no components are present between the casing 114 and the windshield 2. The notch portion 12b is located in front of the camera module 111 being exposed from the casing 114. The notch portion 12b of the bracket 12 is located in front of the camera module 111 exposed from the casing 114. The notch portion 12b is formed in a trapezoidal shape such that the width thereof is increasing frontward in the capturing direction of the camera module 111 to cover the image angle of the camera module 111. As a result, a field vision of the camera module 111 is secured.

The hood 13 is made of resin, having a trapezoidal bottom surface, and side surfaces provided standing perpendicularly on two sides other than the bottomed surface. The hood 13 is put in the notch portion 12b of the bracket 12. According to the present embodiment, the casing 114 is attached to the bracket 12 where the hood 13 is put in, whereby the hood 13 covers the lens barrel member 111b of the camera module 111. The hood 13 is disposed such that the bottom surface of the hood 13 is positioned below the lens barrel member 111b of the camera module 111. Since the hood 13 is arranged in this way, the lens 111*a* is prevented from capturing a scene beyond an angle of view of the camera module 111.

The first heat conduction member 14 is a sheet member made of silicon, having a thermal conductivity larger than or equal to 1 [W/m·K] and smaller than or equal to 50 [W/m·K]. The first heat conduction member 14 has adhesiveness so as to adhere to a material to which the first heat conduction member 14 contacts. The first heat conduction member 14 is provided so as to contact with the casing 114 and the windshield 2 formed in the bracket 12. According to the present embodiment, the first heat conduction member 14 is attached and adhered to the glass side wall portion 1141 of the casing 114. Then, the casing 114 is fixed to the windshield 2 via the bracket 12, whereby the first heat conduction member 14 sticks to the windshield 2 and is adhered therewith. The first heat conduction member 14 has the same dimension and a shape as an upper surface of the glass side wall portion 1141 of the casing 114. Hence, the first heat conduction member 14 contacts to a region 1141*a* in the glass side wall portion 1141, the region 1141*a* being located in a backward portion of the notch portion 1142 with respect to the imaging direction. The first heat conduction member 14 also contacts a region 1141*b* in the glass side wall portion 1141. Both sides of the region 1141*b* sandwich the notch portion 1142.

The second heat conduction member 15 is a sheet member made of the same material as that of the first heat conduction member 14, and is provided contacting with the bracket 12 and the windshield 2 to be located therebetween. According to the present embodiment, the second heat conduction member 15 has the same dimension and a shape as the upper surface of the bracket 12, and is attached to the entire upper surface of the bracket 12. The second heat conduction member 15 is fixed to the bracket 12 and the windshield 2 by using an adhesive. According to the present embodiment, the second heat conduction member 15 is attached to the windshield 2 via a black ceramic 3, so as to prevent an adhesive or the like used for fixing the second heat conduction member 15 to the windshield 2 from being visible from outside the own vehicle. In the black ceramic 3, a trapezoidal missing portion 3*a* is formed corresponding to the image angle of the camera module 111 so as to secure the field of vision of the camera module 111.

The cover 16 is a container-like member having a side wall and a lower wall, being opened in an upper portion. The cover 16 covers, from a lower portion, the image sensor 11, the bracket 12 and the hood 13, whereby these configurations are difficult to be visually recognized from the vehicle cabin of the own vehicle. According to the present embodiment, a through hole 16*a* is formed on a lower surface of the cover 16.

Figure 5:
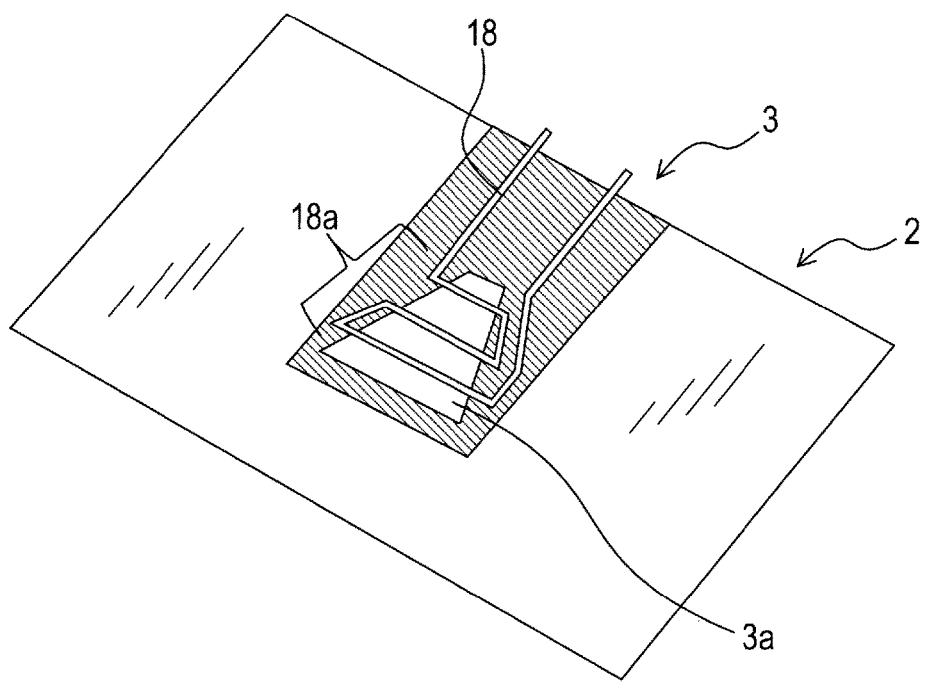
FIG. 5 is a diagram showing an arrangement of a heating wire.

A ventilation fan 17 circulates present air inside the cover 16, and fixed to the cover 16 with being put in the through hole 16*a* formed in the cover 16. The heating wire 18 heats a portion located in front of the lens 111*a* of the camera module 111 in the windshield 2. According to the present embodiment, the heating wire 18 is made of copper, and both ends thereof are electrically connected to a power source which is not shown. The heating wire 18 generates heat when being powered. As shown in FIG. 5, the heating wire 18 is arranged on a surface of the windshield 2 and the black ceramic 3 in the vehicle cabin.

In other words, the heating wire 18 is provided with an S-shaped portion 18*a* which is bent in a S-shape, and the S-shaped portion 18*a* is overlapped on the trapezoidal missing portion 3*a* of the black ceramic 3, thereby being arranged to intercept the missing portion 3*a* a plurality of times, in a direction perpendicular to a height direction of the trapezoidal missing portion 3*a*.

As for a detailed configuration of an image sensor, for example, related art documents such as Japanese Patent Application Nos. 2013-199973, 2014-215644 and 2014-260494 disclose the detailed configurations.

Figure 6:
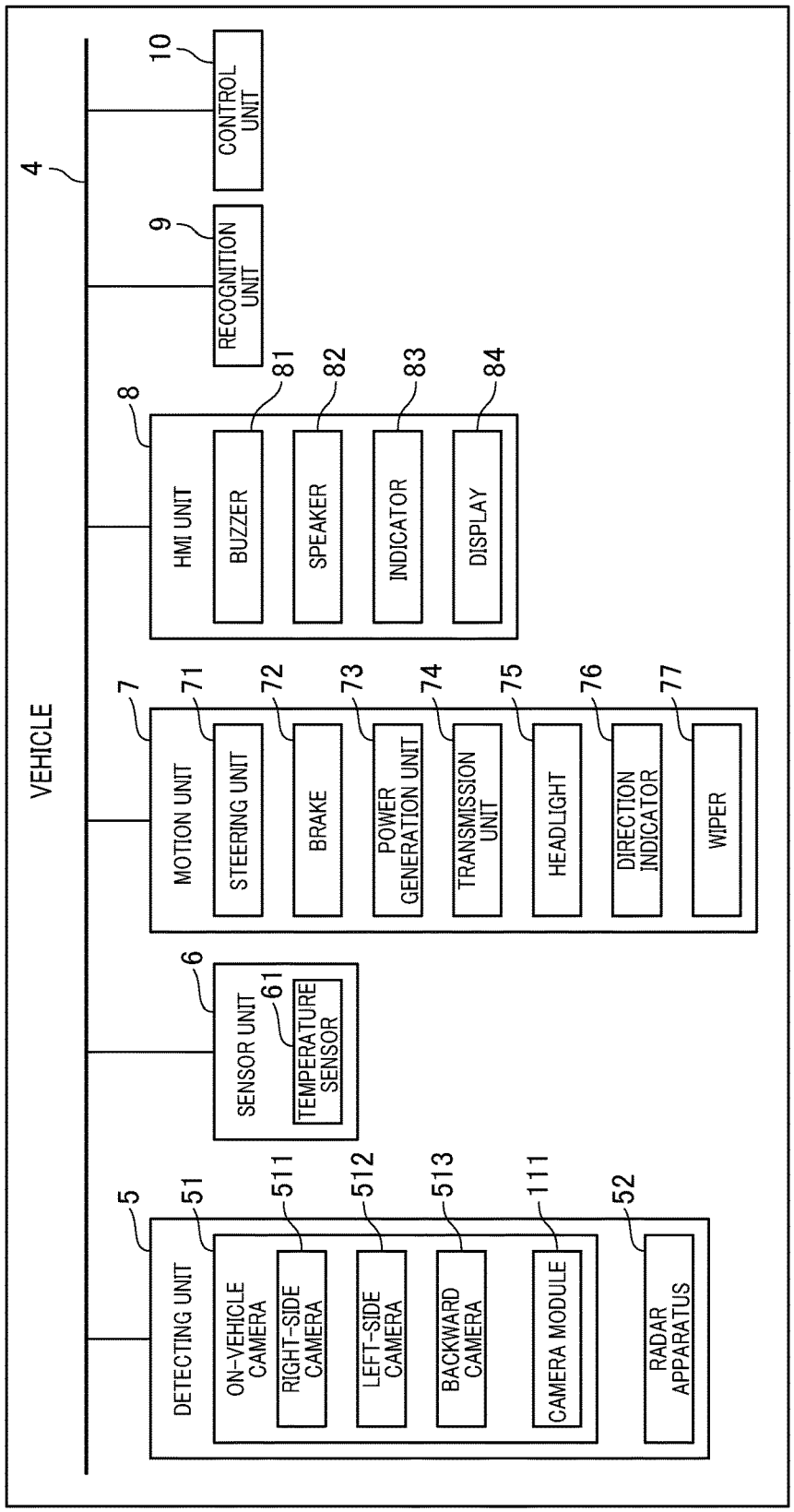
FIG. 6 is a block diagram showing an electrical configuration of a vehicle.

Next, with reference to FIG. 6, electrical function of the camera apparatus 1 will be described. In FIG. 6, members having no electrical functions such as the bracket 12 or the hood 13 are omitted. The own vehicle is provided with a detecting unit 5, a sensor unit 6, a motion unit 7, a human machine interface unit (hereinafter referred to as HMI unit) 8, a recognition unit 9 and a control unit 10, which are connected to a common bus 4.

The detecting unit 5 is provided with an on-vehicle camera 51 and a radar apparatus 52 as apparatuses for detecting a state around the own vehicle. The on-vehicle camera 51 is provided with a right-side camera 511, a left-side camera 512, a backward camera 513 and the above-described camera module 111. The right-side camera 511 is arranged on a right side-view mirror of the own vehicle, capturing a right side of the own vehicle. The left-side camera 512 is arranged on a left side-view mirror of the own vehicle, capturing a left side of the own vehicle. The backward camera 513 is arranged on a rear bumper in a backward portion of the own vehicle, capturing a backward of the own vehicle. Each camera captures scenes around the vehicle so as to repeatedly acquire image data (hereinafter also referred to as captured images).

The radar apparatus 52 is known apparatus in which radar waves of millimeter waves or laser light are transmitted and received so as to detect an object reflecting the radar waves within a predetermined search range. The radar apparatus 52 generates object information including a distance from the own vehicle, a relative speed with respect to the own vehicle, and a lateral position with respect to the own vehicle, and outputs the object information to the recognition unit 9. Further, as a radar apparatus, a sonar (not shown) may be provided to detect an existing object in a predetermined direction which reflects ultrasonic waves transmitted by the sonar.

The sensor unit 6 is provided with a temperature sensor 61 as an apparatus that detects a state of equipment mounted on the own vehicle. The temperature sensor 61 is disposed in the vicinity of the camera module 111, detecting temperature of the camera module 111. The sensor unit 6 includes a device (e.g., GPS: global positioning system device) that outputs positional data of the own vehicle, an apparatus that supplies map data (e.g., a navigation system), a communication apparatus (e.g., portable equipment such as a smartphone, or a road-vehicle communication device), a sensor detecting an environment around the vehicle (e.g., a raindrop sensor, a wiper operational signal, an outside air temperature or the like), other than sensors detecting vehicle behavior such as a vehicle speed sensor, an acceleration sensor, a steering angle sensor and a yaw rate sensor, which are not shown. The sensor unit 6 may use detection data detected by these sensors individually, or combined detection data detected by these sensors.

The motion unit 7 is provided with devices as control objects of a body-system, a power-train system and a chassis system, including a steering unit 71 that changes running direction of the vehicle, a brake 72 that reduces running speed and regenerates energy, a power generation unit 73 configured of a generator such as an engine or a motor, generating power to move the vehicle, a transmission unit 74 that converts a rotational speed and a torque to transmit power, a headlight 75, a direction indicator 76 that indicates a lane change or right/left turns, and a wiper 77 that removes attached substances on the windshield such as raindrops, snow, stains or the like, which cause low visibility.

The HMI unit 8 is provided with, as apparatus serving an interface for communication between a human being and the apparatus, a buzzer 81, a speaker 82, an indicator 83 and a display 84 such as a navigation display provided in a center console, a head-up display provided on the center console, or an electronic mirror (a rearview mirror or a side-view mirror) disposed inside/outside the vehicle. Moreover, other units may be provided including a vibration unit (not shown) configured of an electric motor or the like, vibrating a steering and a seat, a reaction force generator (not shown) that generates a reaction force applied to the steering and a brake pedal. These units may be operated so as to transmit information to the human being from the apparatus. Furthermore, a sensitivity adjusting unit may be provided so as to adjust a sensitivity of a recognition process (phase of easiness for recognition) in a recognition unit and a control unit which will be described later, and a processing timing of a determination process, thereby transmitting information to the apparatus from the human being.

The recognition unit 9 is a part of circuit mounted on the control circuit board 113 and executes a recognition process to recognize a state around the own vehicle, based on the captured image of the on-vehicle camera 51 and the detection result of the radar apparatus 52. It should be noted that the recognition process based on the captured image of the camera module 111 of the on-vehicle camera 51 is referred to as a first recognition process, and a recognition process based on the detection result of the radar apparatus 52 is referred to as a second recognition result. According to the present embodiment, the recognition unit 9 recognizes a traffic lane (also referred to as lane), a road shape, state of the road surface, a light source, a preceding vehicle, an on-coming vehicle, a stationary vehicle, a preceding pedestrian, an on-coming pedestrian, a stationary person, a two-wheeled motor vehicle, a bicycle, an obstacle, a road side object, a sign, a traffic signal, a road sign, a signboard, a tunnel, a refuge place, an object blocking view of the camera module 111, a weather environment, a building and the like.

The road shape refers to a road curvature and a road gradient. The state of road surface refers to, for example, a road surface which is likely to reflect light due to rain or snow. The light source includes, for example, a tail light of a preceding vehicle, a headlight of an on-coming vehicle or the like. A preceding pedestrian is one who walks in front of the own vehicle in the same direction as the own vehicle runs. An on-coming pedestrian is one who walks in front of the own vehicle in an opposite direction to the running direction of the own vehicle. A stationary person refers to a person who remains stationary. An obstacle includes rocks for example. A road side object includes, for example, a curbstone, a guardrail, a pole, a tree, a wall, a building, a parked vehicle and a parked two-wheeled motor vehicle, an electric pole or the like. Also, a refuge place is provided in a road side so as to avoid vehicles approaching from behind the own vehicle. As the object blocking the view of the camera module 111, examples include a stain adhered to a front portion of the lens 111a of the camera module 111 on the windshield 2, or to the lens 111a, or materials such as a paper or the like stuck on an upper portion of the windshield 2. The weather condition includes rain, snow, or backlight for example.

Traffic lanes are recognized by recognizing a position of the white line on the road. The position of the white line is recognized by applying known while line recognition process (e.g., white lane recognition process by using image binarizing process and Hough transform) to the captured image of the camera module 11. The light source is recognized by applying known recognition process to the captured image of the camera module 111. In other words, the recognition unit 9 recognizes, among objects captured in the captured image, an object having a predetermined brightness or more, a close shape to a predetermined shape, and a close color to a predetermined color, and identifies the positional coordinate in the captured image. Also, for example, the recognition unit 9 recognizes a light source as a tail light or a stop lamp of the preceding vehicle, or a headlight of the on-coming vehicle. The recognition unit 9 recognizes a light source as a tail light of the preceding vehicle when the color of the light source is close to red within a predetermined color range, or a stop lamp, and recognizes the light source as a headlight of the on-coming vehicle when the color of the light source is close to white within a predetermined color range.

The control unit 10 is a part of circuit mounted on the control circuit substrate 113, and executes, based on the recognition result of the recognition unit 9, a vehicle control process. According to the present embodiment, the control unit 10 executes, as the vehicle control processes, a lane departure warning process, a lane keeping process, a headlight control process, an head-on collision preventing process, an intersection collision preventing process, a forward collision preventing process, a sign indication process, a speed limit indication process, a speed limit exceeding alert process, an automatic wiper process, a lane change supporting process, an around-view display process, an automatic parking process, an all-speed-range adaptive cruise control process, a blind spot alert process, a backward cross traffic alert process, a forward cross traffic alert process, an inter-vehicle distance alert process, a rear-end collision alert process and an erroneous start prevention process.

For the lane departure alert process, the control unit 10 performs a lane departure decision, and outputs an alert sound from a buzzer 81 and a speaker 82 based on the decision result of the lane departure decision so as to alert the passenger of the own vehicle. The lane departure decision determines whether or not the own vehicle is going to depart the lane, or has been departed the lane. The lane departure alert process is executed based on the recognition result of the lane and the road shape or the like.

The lane keeping process controls the steering unit 71, based on the recognition result of the lane, the road shape or the like, to prevent the own vehicle from departing from the lane.

The headlight control process controls the headlight 75 in the own vehicle between high beam and low beam, and also controls the light axis of the headlight 75 to be swiveled. The headlight control process is executed based on the recognition result of the lane, the road shape and the light source or the like.

The head-on collision preventing process controls, when the own vehicle is likely to collide with a vehicle or the like crossing ahead of the own vehicle before an intersection, objects related to a movement of the own vehicle such as the steering unit 71 and the brake 72 to prevent the collision therebetween. The intersection collision preventing process controls, when the own vehicle is changing running direction in the intersection and is likely to collide with a pedestrian or a vehicle or the like, objects related to a movement of the own vehicle such as the steering unit 71 and the brake 72 to prevent the collision therebetween. The forward collision preventing process controls, when the own vehicle is likely to collide with the preceding vehicle, objects related to a movement of the own vehicle such as the steering unit 71 and the brake 72 to prevent the collision therebetween. The head-on collision preventing process, the intersection collision preventing process and the forward collision preventing process include processes which output an alert sound from the buzzer 81 and the speaker 82, in the case where a signboard or a tunnel is recognized, but the own vehicle cannot pass under the signboard or cannot pass through the tunnel. The head-on collision preventing process and the intersection collision preventing process are executed based on the recognition result about the state of the road surface, preceding vehicle, on-coming vehicle, stationary vehicle, preceding pedestrian, on-coming pedestrian, stationary person, two-wheeled motor vehicle, bicycle, obstacle, road side object, signboard and tunnel or the like. Also, the forward collision preventing process is executed based on the recognition result about the refuge place, in addition to the recognition result used when the head-on collision preventing process and the intersection collision preventing process are executed.

The sign indication process displays, on the display 84, contents of the sign, the traffic signal, the road sign and the signboard. The sign indication process is executed based on the detection result about the sign, the traffic signal, the road sign and the signboard. The speed limit indication process is executed based on the recognition result of the sign or the like, so as to display the speed limit indicated on the sign on the display 84.

The speed limit exceeding alert process is executed based on the recognition result of the sign or the like, when the own vehicle runs exceeding the speed limit, so as to output an alert sound from the buzzer 81 and the speaker 82, alerting the occupants of the own vehicle.

The automatic wiper process controls operation of the wiper 77 when needed due to rain or the like. The automatic wiper process is executed when a decrease of visibility is determined on the basis of the recognition result about the state of the road surface and the weather condition or the like.

The lane change supporting process controls the steering unit 71, the brake 72, the transmission unit 74 and the direction indicator 76 so as to support the driver when changing the lane. For example, the lane change supporting process detects a vehicle running on an adjacent lane, and notifies the driver when the driver changes lane. The around-view display process displays the captured image all around the own vehicle on the display unit 84. The automatic parking process controls the steering unit 71 and the brake 72 so as to automatically park the own vehicle. The all-speed-range adaptive cruise control process controls the brake 72, the power generation unit 73 and the transmission unit 74 so as to have the own vehicle run tracking a preceding vehicle. It should be noted that the lane change supporting process, around-view display process, automatic parking process and all-speed-range adaptive cruise control are executed based on the recognition results of the traffic lane, road shape, preceding vehicle, on-coming vehicle, stationary vehicle, preceding pedestrian, on-coming pedestrian, stationary person, two-wheeled motor vehicle, bicycle, obstacle, road side object, the light source, a sign, a traffic signal and the road sign or the like.

The blind spot alert process controls the buzzer 81 and the speaker 82 to output sound to alert the driver, when a vehicle or the like enters a diagonal-backward area which is a blind spot of the own vehicle. The backward cross traffic alert process controls the buzzer 81 and the speaker 82 to output sound to alert the driver, in the case where a vehicle or the like enters a diagonal-backward area which is a blind spot of the own vehicle, when the own vehicle runs backward in a parking lot or the like. The forward cross traffic alert process controls the buzzer 81 and the speaker 82 to output sound to alert the driver, in the case where a vehicle or the like is present in a blind spot area in front of the own vehicle, when the own vehicle runs in an intersection having low visibility. It should be noted that the blind spot alert process, the backward cross traffic alert process and the forward cross traffic alert process are executed based on the recognition results of any preceding vehicle, on-coming vehicle, stationary vehicle, preceding pedestrian, on-coming pedestrian, stationary person, two-wheeled motor vehicle, bicycle, obstacle, road side object, light source, sign, traffic signal and road sign or the like.

The inter-vehicle distance alert process controls the buzzer 81 and the speaker 82 to alert the driver, in the case where the inter-vehicle distance between the own vehicle and the preceding vehicle becomes shorter than a predetermined alert distance. The rear-end collision alert process outputs sound from the buzzer 81 and the speaker 82 to alert the driver when the own vehicle is likely to collide with the preceding vehicle. The inter-vehicle distance alert process and the rear-end collision alert process are executed based on the recognition result about the preceding vehicle and the light source. The erroneous start prevention process is a process that controls the brake 72, when the own vehicle has been stopped and the driver presses the accelerator despite a building being present in the forward direction of the own vehicle. The erroneous start prevention process is executed based on the recognition result about the building and the light source or the like.

The control unit 10 stops a part of control executed in the vehicle control process, especially a control of objects related to the movement of the own vehicle, such as the steering unit 71 and the brake 72 or the like, when an object that blocks the view of the camera module 111 is recognized in the above-described vehicle control processes. Moreover, the control unit 10 also stops at least a part of control executed in the vehicle control process, when a weather condition such as a heavy rain is recognized in the above-described vehicle control processes, in which the camera module 111 is unable to recognize the image.

The control unit 10 executes a later-described switch process (FIG. 7), so as to switch between the first recognition process based on the captured image of the camera module 111 and the second recognition process based on the detection result of the radar apparatus 52.

[1-2 Process]

Figure 7:
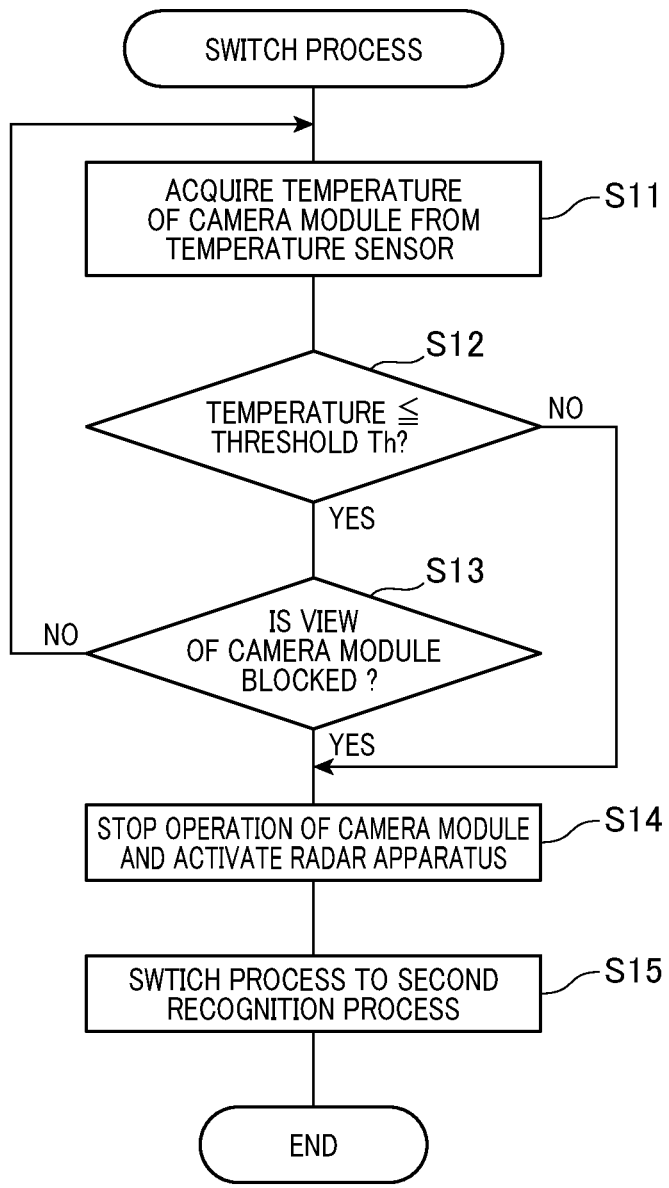
FIG. 7 is a flowchart showing a switch process.

Hereinafter, with reference to the flowchart shown in FIG. 7, the switch process executed by the control unit 10 will be described. The switch process is activated when the ignition switch of the own vehicle is turned ON. When the switch process is activated, the radar apparatus 52 is not operating, but the recognition unit 9 is executing the recognition process (first recognition process) based on the captured image of the camera module 111.

First, at step S11 (S represents step), the control unit 10 acquires the temperature of the camera module 111 from the temperature sensor 61. Then, the control unit 10 determines whether or not the temperature of the camera module 111 is a predetermined threshold Th or less (S12). For example, the threshold Th is set to 105° C. which is slightly lower than heat resistance temperature of the camera module 111. In other word, according to the present embodiment, the camera module 111 can operate with a temperature condition at 105° C. or less to execute the process. The control unit 10 determines whether or not the view of the camera module is blocked (S13), when it is determined that the temperature of the camera module 111 is the threshold Th or less (S12: YES). When the control unit 10 determines that the view of the camera module 111 is not blocked (S13: NO), the process returns to step S11 and repeatedly executes processes after step S11.

On the other hand, when the control unit 10 determines that the view of the camera module 111 is blocked (S13: YES), the control unit 10 stops operation of the camera module 111 and activates the radar apparatus 52 (S14). Then, the control unit 10 switches the first recognition process to the second recognition process (S15) and terminates the switch process. Similarly, when the control unit 10 determines, at step S12, that the temperature of the camera module 111 is not the threshold Th or less (i.e., exceeding the threshold Th), (S12: NO), the control unit 10 executes processes after step S14. In other words, the control unit 10 switches the first recognition process to the second recognition process, when the temperature of the camera module 111 exceeds the threshold Th or the view of the camera module 111 is blocked.

[1-3 Effects and Advantages]

According to the above-described first embodiment, the following effects and advantages can be obtained.

(1a) In the camera apparatus 1 mounted on the vehicle, capturing an image in front of the vehicle, the camera module 111 including the lens 111a and the image sensor 26 (See FIG. 8) and the control circuit board 113 are provided. As the lens 111a, resin-made lens is used. Hence, comparing a configuration using a glass lens as the lens 111a, the lens 111a has light weight and can be formed easily. Further, the lens 111a is highly shockproof. As a result, the camera apparatus can be produced with light weight and low cost, obtaining a long operating life.

(2a) The camera module 111 can be operated under a temperature condition of 105° C. or less. Hence, robustness is enhanced to obtain the recognition result based on the captured image of the camera module 111, whereby at least two vehicle control processes among the headlight control process, the forward collision preventing process and the lane departure warning process can be favorably executed.

2. Second Embodiment

[2-1. Differences Between the First Embodiment and the Second Embodiment]

Since the second embodiment is similar to that of the first embodiment in their fundamental configurations, an explanation of the common configuration is omitted, and only different configuration will be mainly described.

In the above-described first embodiment, detailed explanations are omitted for an internal configuration of the lens barrel member 111b including the lens 111a, and the shape of the lens 111a. However, in the second embodiment, these configurations will be described. According to the second embodiment, an optical filter is provided, which is different from that of the first embodiment. In the first embodiment, the camera module 111 and the control circuit board 113 are accommodated in the same casing 114. In contrast, according to the second embodiment, each of the camera module 111 and the control circuit board 113 are accommodated in different casings, which is different from that of the first embodiment. In the first embodiment, an RGBC Bayer is provided as a group of color filters. However, according to the second embodiment, as a group of color filters, an RCCC Bayer is provided, which is different from that of the first embodiment.

[22 Configuration of the Image Sensor 11]

Figure 8:
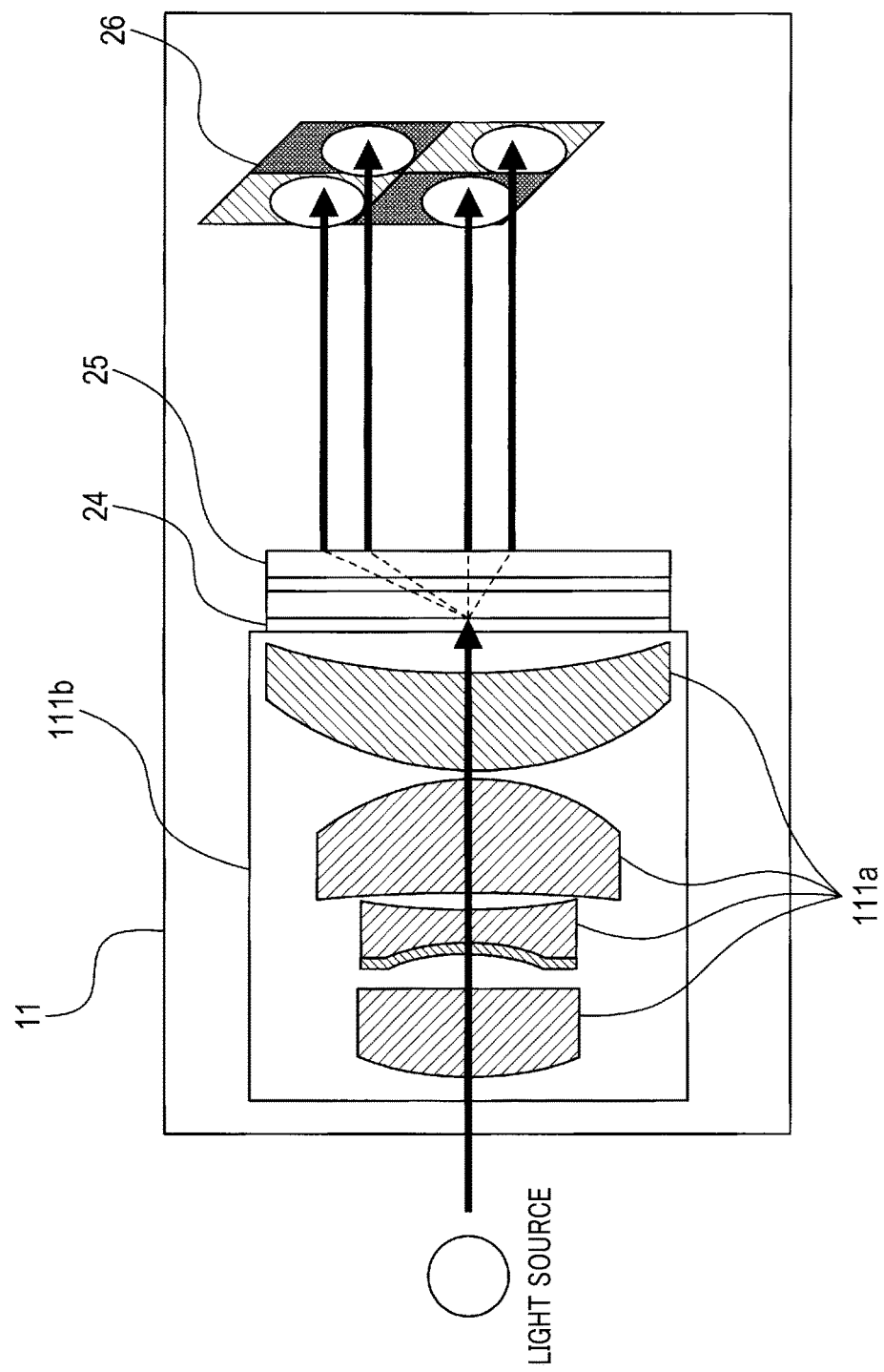
FIG. 8 is a diagram showing an overall configuration of the image sensor.

The image sensor 11 shown in FIG. 8 is provided with a plurality of lenses 111a, a lens barrel member 111b, an infrared cut filter 24, an optical high pass filter 25 and an image sensor 26.

The lenses 111a refract incident light to be diverged or focused, thereby forming an optical image on the surface of the image sensor 26, from the transmitted incident light. For example, the lenses 111a can be configured of four lenses including a plano-convex lens, a biconcave lens, a convex meniscus lens so as to suppress aberration such as chromatic aberration, or coma aberration. Also, at least one of the plurality of lenses 111a can be configured of an aspherical lens.

As shown in FIG. 9A, the spherical lens includes a refractive surface of which the spherical surface shape is defined to have a single curvature. In the spherical lens, the focal position is likely to change depending on locations of the refractive surface (i.e., center location and peripheral location). In other words, the condensing position is likely to change depending on the angle of the incident light entering the lens 111a (referred to as a field curvature phenomenon). However, as shown in FIG. 9B, the refractive surface of the aspherical lens includes a curved surface which is not a plane surface or a spherical surface. By optimizing the shape of a peripheral part of the refractive surface, the focal positions can be the same at the central part and the peripheral part thereof, so that the field curvature phenomenon is unlikely to occur. As a result, without curvature being required for the surface of the image sensor 26, a decrease of the resolution can be avoided around the peripheral part on the surface of the image sensor 26.

The lens barrel member 111b accommodates a plurality of lenses 111a therein, forming a sealed space purged by nitrogen. The infrared cut filter 24 is an optical filter that attenuates the incident light entering the image sensor 26, having spectral characteristics which transmits light having a wavelength less than or equal to an upper limit value of a predetermined cutoff wavelength (hereinafter referred to as upper cutoff wavelength), to cut off the infrared light. Specifically, the infrared light filter 24 cuts off light having a wavelength exceeding the upper cutoff wavelength which is selected from a wavelength region ranging from 650 nm to 750 nm. According to the present embodiment, the upper cutoff wavelength is set to 700 nm to cut off near infrared light included in the incident light. Also, the infrared light filter 24 is disposed at the rear side of the lenses 111a, but may be disposed at the front side of the lens 111a.

The optical high pass filter 25 serves as an optical filter that attenuates the incident light entering the image sensor 26, having spectral characteristics which transmits light having the wavelength more than or equal to a lower limit value (hereinafter referred to as lower cutoff wavelength) of a predetermined cutoff wavelength. The cutoff wavelength is determined based on a change ratio of the transmittance of the lens 111a which changes before/after the yellowing of the lens 111a. Specifically, the optical high pass filter 25 cuts off light having wavelength less than the lower cutoff wavelength which is selected from a wavelength region ranging from 400 nm to 500 nm. It should be noted that the lower cut off wavelength is set to be 450 nm.

Figure 10A:
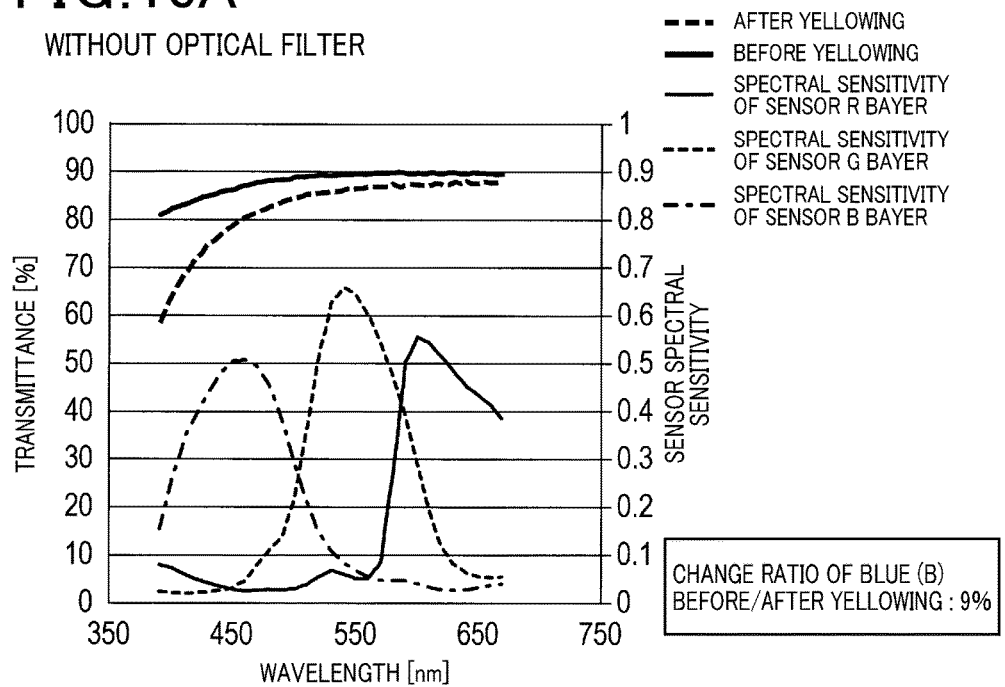
FIGS. 10A and 10B are a set of graphs showing effects of an optical high pass filter, where
Figure 10B:
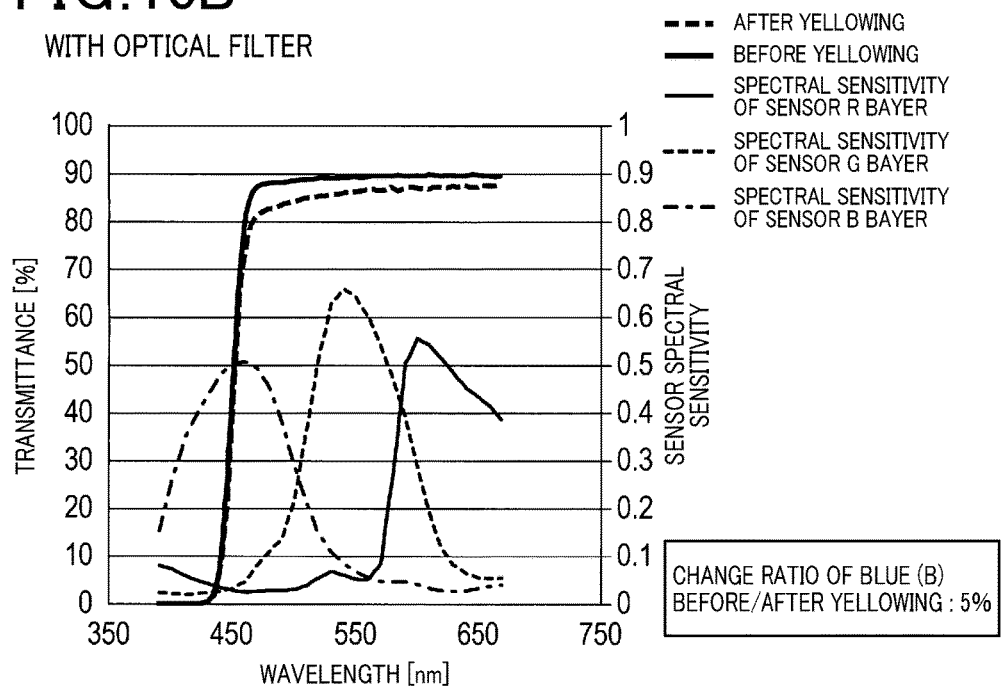
Figure 11A:
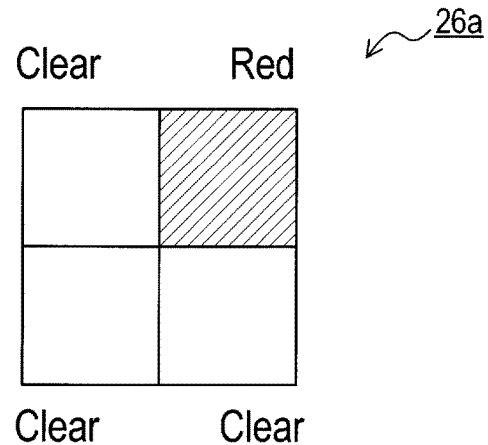
FIGS. 11A and 11B are a set of diagrams an explanatory diagram showing an arrangement of color filters configuring an RCCC Bayer, where
Figure 11B:
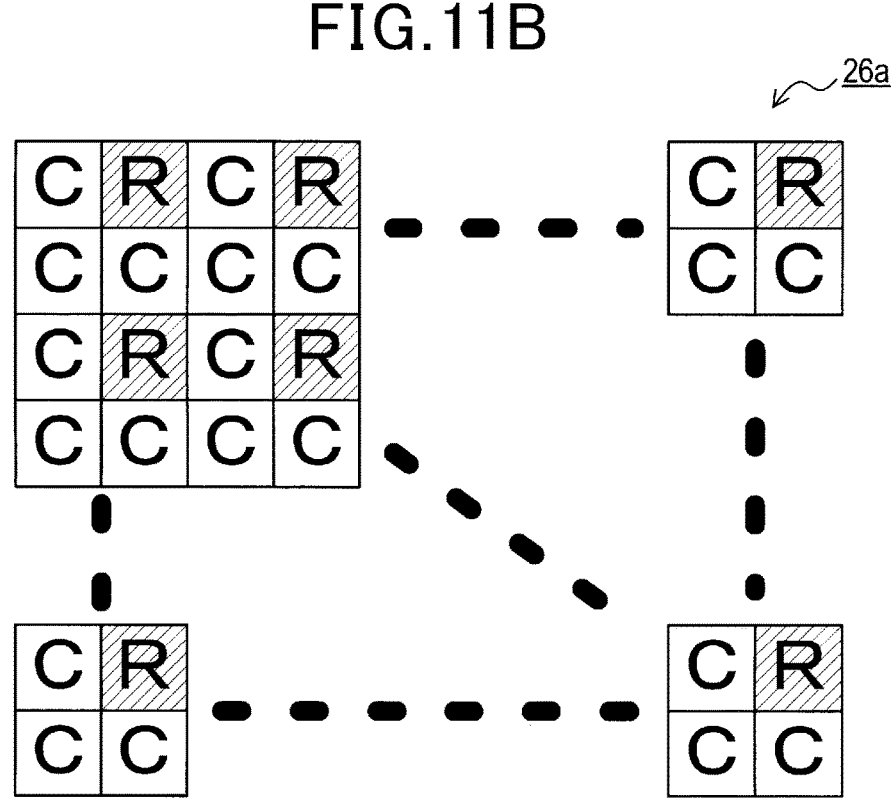

FIGS. 10A and 10B illustrate the transmittances before/after occurrence of yellowing of the lens 111a, and spectral sensitivities of RGB (red (R), green (G), blue (B)) filters among four types of color filters which composes an unit pattern of the RGBC Bayer. FIG. 10A illustrates a case where the optical filter 25 is not disposed and FIG. 10B illustrates a case where the optical high pass filter 25 is disposed. It should be noted that both FIGS. 10A and 10B illustrate a case where the infrared cut filter 24 is disposed.

As shown in FIG. 10A, according to a simulation result, compared to the lens 111a before the yellowing occurs, a change ratio of the transmittance of the lens 111a becomes larger after the yellowing of the lens 111a, when the wavelength becomes smaller. Also, as shown in FIG. 10B, according to a simulation result, a change ratio of the transmittance is minimized before/after the yellowing of the lens 111a, by setting the lower cutoff wavelength of the optical high pass filter 25 to be 450 nm. Thus, the change ratio of the spectral sensitivity of the blue (B) filter before/after the yellowing was 9%, when the optical high pass filter 25 is not disposed, and was 5% when the optical high pass filter 25 is disposed. In other words, the optical high pass filter 25 is provided, thereby lowering the change ratio of a light-reception sensitivity of blue (B) pixel which significantly changes before/after yellowing of the lens 111a. Accordingly, the change ratio of the light-receiving intensity of the image sensor 26 is minimized as a whole, before/after occurrence of the yellowing.

The optical high pass filter 25 is disposed at a rear side of the plurality of lenses 111a and the infrared cut filter 24. However, the optical high filter 25 may be disposed at a front side of the infrared cut filter 24 or disposed at a font side of the plurality of lenses 111a. The optical high pass filter 25 is configured such that the incident light transmitting through the plurality of lenses 111a and the infrared cut filter 24 is divided by four by means of polarized characteristics, and each of the four divided incident light is transmitted to any one of four pixels composing a basic unit of the image sensor 26. However, the polarized filter having polarized characteristics may be provided individually. In FIG. 8, to easily view drawings and to easily understand operation of the optical high filter 25 as a polarized filter, the image sensor 26 is illustrated with only four enlarged pixels which configure the basic unit.

The image sensor 26 is configured of the above-described array type image sensor, and RCCC Bayer 26a which is a group of color filters of which the pass band is a wavelength region corresponding to red or transparent color. Each of the image sensor elements (i.e., respective pixels) is configured so as to receive the incident light through any one of color filters which composes the RCCC Bayer 26a.

The RCCC Bayer 26a is composed of color filters such that color filters corresponding to respective pixels are arranged in a certain pattern. The RCCC Bayer 26a is composed of two types of color filters which are R (red) and C (transparent). As an unit pattern, a pattern for four pixels is used, covering entire array type image sensor. Assuming the above two types of color filters composing the RCCC Bayer 26a to be R-filter and C-filter, the passband of the R-filter is set to allow light having wavelength corresponding to red to pass therethrough, and the passband of the C-filter is set to include all passbands corresponding to specific colors (red, green and blue).

Figure 12:
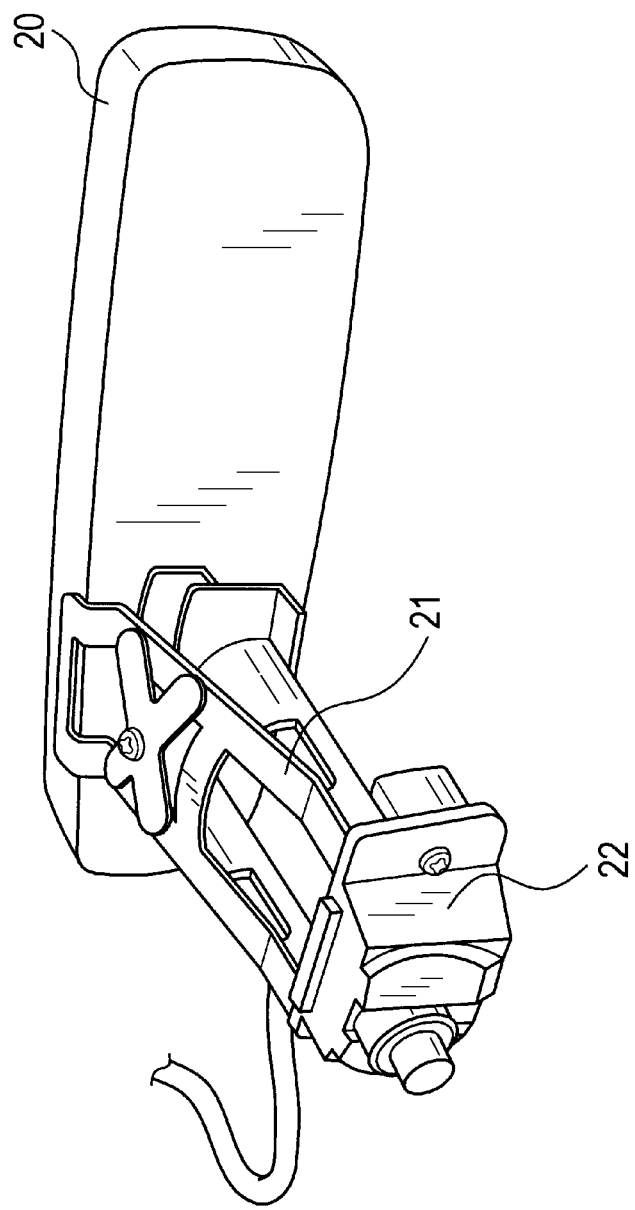
FIG. 12 is a diagram showing an outline of a casing integrated to a rearview mirror.

According to the present embodiment, the camera module 111 and the control circuit board 113 are accommodated separately in different casings. For example, a casing 20 integrated to a rear view mirror shown in FIG. 12 may be provided to accommodate the control circuit board 113, and the above-described casing 114 may accommodate the camera module 111. Further, for example, a casing 22 may be provided, being supported by the casing 20 integrated to the rear view mirror via a fixed arm 21, to accommodate the camera module 111, and the control circuit board 113 may be accommodated in the casing 20. Further, the electrical wiring 112 may be provided in the fixed arm 21.

[2-3 Effect]

According to the second embodiment, the following effects can be obtained in addition to the effects (1a)-(2a) described in the first embodiment.

(1b) Since the optical high pass filter 25 is provided having spectral characteristics which transmits light having the wavelength more than or equal to a lower limit value of a predetermined cutoff wavelength determined based on a change ratio of the transmittance of the lens 111a which changes before/after the yellowing of the lens 111a, a change in the light-receiving intensity in the imager can be minimized before/after the yellowing of the lens 111a. Thus, in the recognition process, for example, binarization of the image data can be performed using a predetermined threshold so that the recognition result can be obtained without degrading the accuracy even after the yellowing of the lens 111a. Accordingly, at least two vehicle control processes, among the headlight control process, the forward collision preventing process and the lane departure warning process, can be favorably executed, contributing to an improvement of reliability and lifetime.

(2b) Since the lower cutoff wavelength is within a wavelength region ranging from 400 nm to 500 nm, a change ratio in the light-receiving intensity of the imager can be minimized before/after the yellowing.

(3b) Since the infrared cut filter 24 is provided, having spectral characteristics which transmits light having the wavelength less than or equal to a predetermined upper cut off wavelength limit to cut off the infrared light, the imager receives only incident light having wavelength corresponding to the visible light. Thus, robustness can be enhanced for the recognition process.

(4b) Since the upper cutoff wavelength is within a wavelength region ranging from 650 nm to 750 nm, the infrared light can be favorably cutoff.

(5b) An aspheric lens is used as the lens 111a, whereby a decrease of the resolution can be avoided around the peripheral part on the surface of the imager, without curvature of the surface of the imager being required.

(6b) The sealed space inside the lens barrel member 111b is purged with nitrogen so that the lens 111a can be prevented from being oxidized, and yellowing of the lens 111a can be minimized.

(7b) Each of the pixels in the imager is configured so as to receive incident light transmitted through respective color filters which compose the RCCC Bayer 26a. Hence, recognition accuracy of red/white objects can be improved. Accordingly, the recognition accuracy can be improved for objects necessary for the lane recognition such as a white line, guardrail or the like, or a light source (including other vehicle) such as a head light or a tail lamp.

(8b) Since the camera module 111 and the control circuit board 113 are accommodated separately in different casings, the camera module 111 and the control circuit 113 are distributed in separate casings, whereby each of the casings can be shrunk and design flexibility in the vehicle cabin can be improved.

3. Other Embodiment

The present disclosure is not limited to the above-described embodiments. However, various modifications can be implemented to the present disclosure.

Figure 13:
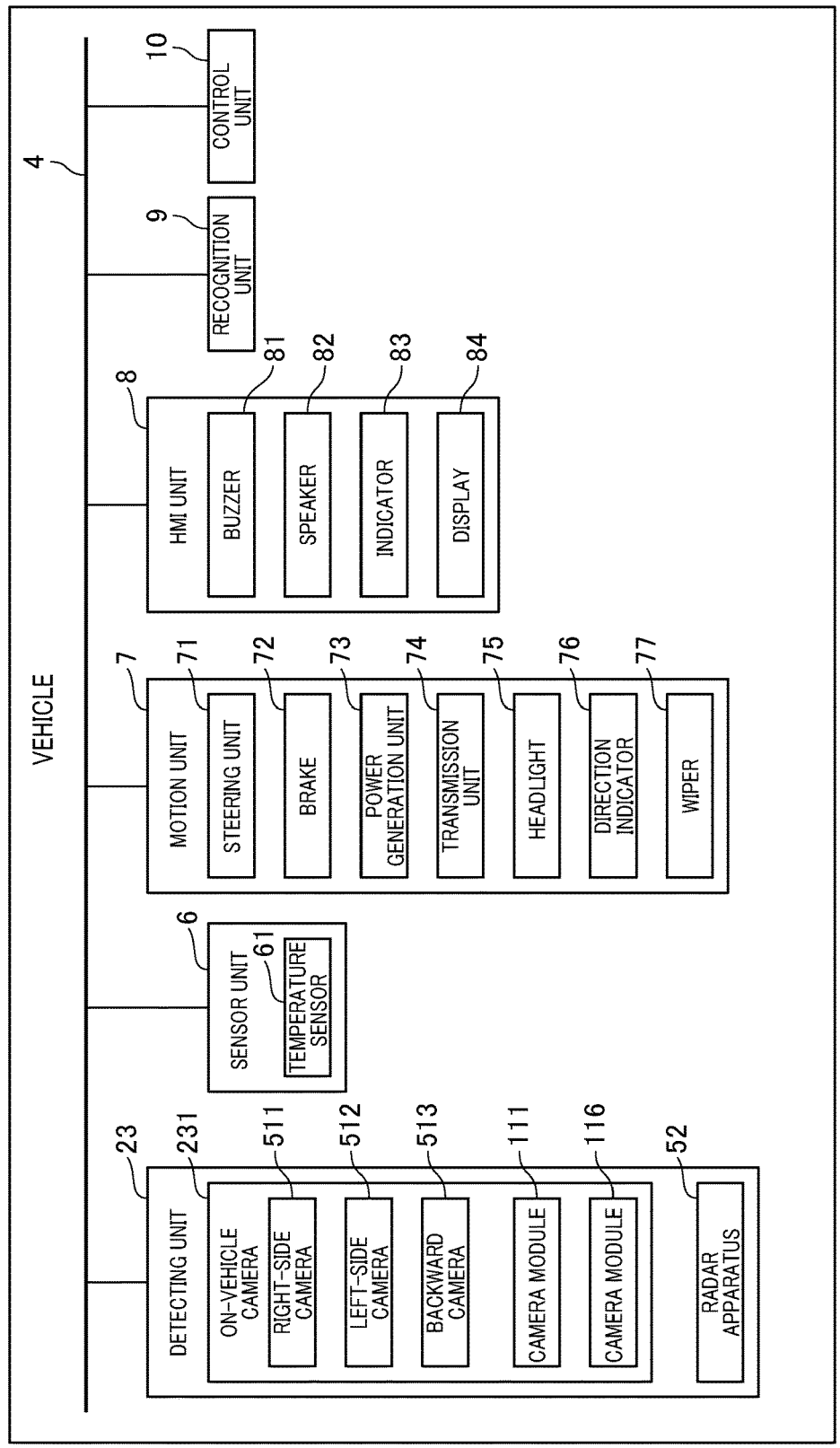
FIG. 13 is a block diagram showing an electrical configuration of a vehicle in the case where the camera apparatus is a stereo camera.

(3A) According to the above-described embodiment, the camera apparatus 1 is a molecular camera. However, the camera apparatus is not limited to the molecular camera. For example, as shown in FIG. 13, the camera apparatus may be a stereo camera. The vehicle shown in FIG. 13 is provided with a detecting unit 23 including an on-vehicle camera 231 and a radar apparatus 52. The radar apparatus 52 shown in FIG. 13 is the same as the radar apparatus 52 shown in FIG. 6. The on-vehicle camera 231 is provided with a right-side camera 511, a left-side camera 512, a rear-side camera 513, a camera module 111 and a camera module 116. In other words, the vehicle shown in FIG. 13 is further provided with the camera module 116, which is different from the vehicle shown in FIG. 6. The camera module 116 has the same configuration as the camera module 111. The camera modules 111 and 116 are accommodated in a single casing. The casing is disposed in a center portion (close to rear view mirror) of the upper area of the windshield via the bracket. The camera module 111 and the camera module 116 are disposed at both left and right sides with respect to the center portion of the windshield. As shown in FIG. 13, the camera module 111 and the camera module 116 are accommodated in the single casing. However, the camera module 111 and the camera module 116 may be accommodated separately in different two casings. Also, the camera module 111 and the camera module 116 are disposed at both left and right sides with respect to the center portion of the windshield in the upper area of the windshield. However, dispositions of the camera module 111 and the camera module 116 are not limited to these positions.

(3B) According to the above-described embodiment, the radar apparatus 52 is operated during a period when the camera module 111 is not operating. However, an operating period of the radar apparatus 52 is not limited to this period. For example, the radar apparatus 52 and the camera module 111 can be simultaneously operated. In this case, the recognition unit 9 may execute a recognition process based on the captured image of the camera module 111 and the radar apparatus 52.

(3C) According to the above-described embodiments, the process is switched between the first recognition process and the second recognition process, when either one of conditions is satisfied, the conditions including a condition where temperature of the camera module 111 exceeds a threshold Th and a condition where a view of the camera module 111 is disturbed. However, the condition to switch the processes is not limited to these conditions. For example, the process may be switched between the first recognition process and the second recognition process, when a fault is detected in the camera module 111.

(3D) According to the above-described embodiments, a switching process is terminated once the first recognition process or the second recognition process is switched. However, the first and second recognition processes may be switched multiple times. For example, in the case where the first recognition process is switched to the second recognition process when the temperature of the camera module 111 exceeds the threshold Th, the second recognition process may be switched to the first recognition process when the temperature of the camera module 111 is lower than or equal a predetermined threshold which is lower than the threshold Th. In this case, the camera apparatus 1 is rapidly cooled by means of cooling effects of the first heat conduction member 14 and the second heat conduction member 15. Hence, a time required for the second recognition process switching to the first recognition result (i.e., time required to resume the first recognition process) can be shortened.

(3E) According to the above-described embodiments, the camera apparatus 1 and the radar apparatus 52 detect a state in front of the own vehicle. However, a combination of apparatuses to detect a state in front of the own vehicle is not limited thereto. For example, the camera apparatus 1 and a sonar may detect the situation in front of the own vehicle.

(3F) According to the above-described embodiments, the recognition unit 9 is capable of executing both the first and second recognition processes. However, the recognition unit 9 may be configured to execute only the first recognition process. In this case, the own vehicle may be provided with only the camera apparatus 1 as an apparatus for detecting a state in front of the own vehicle.

(3G) The control unit 10 may execute a part of various vehicle control processes. For example, the headlight control process may generate a headlight control command signal such as a high-beam command signal or a low-beam command signal and transmit the command signals to the external control unit such as a headlight apparatus.

(3H) An anti-reflection coating (i.e., AR coating) may be applied to the lens 111a, thereby suppressing reflected light such as sun light or light from headlights entering the imager.

(3I) A function included in one element of the above-described embodiments can be distributed into a plurality of elements, or a function included in a plurality of elements may be integrated to one element. Moreover, a part of configurations in the above-described embodiments may be omitted. At least a part of configurations in the above-described embodiments may be added to a configuration in other embodiment in the above-described embodiments, or may replace a configuration in other embodiment in the above-described embodiments. Note that embodiments of the present disclosure are defined as various aspects included in technical ideas specified by words in the claims.

What is claimed is:

1. An on-vehicle camera apparatus mounted in a vehicle cabin, capturing an image in front of a vehicle, the apparatus comprising:

a camera module including an optical element that refracts incident light so as to diverge or focus the incident light, and an image sensor element in which incident light transmitted through the optical element forms an image, the camera module outputting image data based on a signal to which a photoelectric conversion is applied by the imaging sensor element; and a control circuit board executing, based on the image data outputted by the camera module, a recognition process recognizing a state in front of the own vehicle, and executing, based on a recognition result of the recognition process, at least two vehicle control processes among a headlight control process, a forward collision preventing process and a lane departure warning process, wherein a resin-made lens is used for the optical element, the camera module further comprises an optical filter that attenuates the incident light entering the image sensor element, and the optical filter has spectral characteristics which transmits light having a wavelength more than or equal to a predetermined lower cutoff wavelength, the predetermined lower cutoff wavelength being determined based on a change ratio of a transmittance of the resin-made lens which changes before/after yellowing of the resin-made lens.

2. The on-vehicle camera apparatus according to claim 1, wherein the lower cutoff wavelength is selected from a wavelength region ranging from 400 nm to 500 nm.

3. The on-vehicle camera apparatus according to claim 1, wherein
the camera module further comprises optical filter that attenuates the incident light entering the image sensor element; and
the optical filter has spectral characteristics which transmits light having a wavelength less than or equal to a predetermined upper cutoff wavelength to cut off infrared light.

4. The on-vehicle camera apparatus according to claim 3, wherein
the upper cutoff wavelength is selected from a wavelength region ranging from 650 nm to 750 nm.

5. The on-vehicle camera apparatus according to claim 1, wherein an aspherical lens is used as the optical element.

6. The on-vehicle camera apparatus according to claim 1, wherein
the camera module further comprises a lens barrel member accommodating a plurality of resin-made lenses; and
nitrogen is purged in the lens barrel member.

7. The on-vehicle camera apparatus according to claim 1, wherein
the camera module further comprises RCCC Bayer which is a group of color filters, each of the color filters having a pass band which is a wavelength region corresponding to red or transparent color; and
each of the image sensor elements receives the incident light through any one of color filters which composes the RCCC Bayer.

8. The on-vehicle camera apparatus according to claim 1, wherein
the camera module and the control circuit board are accommodated separately in different casings.

9. The on-vehicle camera apparatus according to claim 1, wherein
the camera module is operable under a temperature condition of 105° C. or less.

* * * * *